United States Patent [19]
Langlet et al.

[11] Patent Number: 5,991,282
[45] Date of Patent: Nov. 23, 1999

[54] RADIO COMMUNICATION SYSTEM WITH DIVERSITY RECEPTION ON A TIME-SLOT BY TIME-SLOT BASIS

[75] Inventors: Carl Erik Joakim Langlet, Farentuna; Bo Anders Granstrom, Jarfalla, both of Sweden

[73] Assignee: Telefonaktiebolaget LM Ericsson, Stockholm, Sweden

[21] Appl. No.: 08/864,684

[22] Filed: May 28, 1997

[51] Int. Cl.[6] .................................................... H04Q 7/00
[52] U.S. Cl. ............................................ 370/332; 370/347
[58] Field of Search ................................... 370/331, 332, 370/333, 334, 337, 264, 347

[56] References Cited

U.S. PATENT DOCUMENTS

| | | | |
|---|---|---|---|
| 5,542,107 | 5/1990 | Kay | 455/33.1 |
| 5,577,047 | 11/1996 | Persson et al. | 370/95.3 |
| 5,812,935 | 9/1998 | Kay | 455/56.1 |

FOREIGN PATENT DOCUMENTS

| | | |
|---|---|---|
| 0 454 368 A2 | 10/1991 | European Pat. Off. . |
| 0 501 808 A2 | 2/1992 | European Pat. Off. . |
| 4-227136 | 8/1992 | Japan . |
| 7-273705 | 10/1995 | Japan . |

*Primary Examiner*—Chi H. Pham
*Assistant Examiner*—Kim T. Nguyen
*Attorney, Agent, or Firm*—Burns, Doane, Swecker & Mathis, L.L.P.

[57] ABSTRACT

A communication system base station improves uplink coverage on a time slot by time slot basis. The coverage is improved by allocating diversity and non-diversity time-slots based on received signal quality of an RF link between a mobile station and a base station. The diversity time-slots are time slots during which information is received by more receiver branches than during the non-diversity time-slots.

32 Claims, 4 Drawing Sheets

RADIO COMMUNICATION SYSTEM WITH DIVERSITY RECEPTION ON A TIME-SLOT BY TIME-SLOT BASIS

BACKGROUND

This invention generally relates to the field of communication systems and, more particularly, to the improvement of receiver sensitivity, adjacent-channel and co-channel rejection in a communication system that sub-divides RF channels into time slots.

Time division multiple access (TDMA) communication systems, such as those based on GSM, PDC, D-AMPS communication standards, subdivide one or more radio frequency (RF) channels into a plurality of time slots during which mobile stations within the system engage in voice and data communication. By transmitting and receiving bursts of information during allocated time slots, the mobile stations communicate through a plurality of scattered base stations, which cover corresponding communication cells. Within each cell, a base station communicates with the mobile stations over a number of RF channels by transmitting bursts of downlink data to the mobile stations over downlink RF channels and receiving bursts of uplink data from the mobile stations over uplink RF channels.

To avoid co-channel interference, neighboring cells are allocated different RF channels. Because of the relatively low power RF transmissions within a particular cell, another cell spaced two or more cells apart may typically reuse the same frequency. The farther the cells reusing the same frequencies are from each other, the lower the co-channel interference between them. Therefore, lowering co-channel interference of the uplink channels increases system capacity by allowing a tighter frequency reuse cell pattern in a dense communication network.

It is also very important to provide wide coverage using fewer number of base stations, to reduce implementation cost of the network. One factor that is directly related to a base station's coverage is its sensitivity to received signals on the uplink channel. Some conventional systems equip the base stations with low noise amplifiers, which are positioned at close proximity to base station antennas.

Another conventional method to improve both co-channel interference and receiver sensitivity uses receiver diversity under which two or more spaced apart antennas that are coupled to corresponding receiver branches receive uplink signals from the mobile station. Based on well known principles that relate to combining non-coherent noise and desired signals, received signal quality is improved by combining received signals from the receivers. For example, some conventional GSM systems combine uplink signals received by two receiver branches at the base station, to improve uplink received signal quality on a continuous basis. Other systems combine received signals from two or more receiver branches, when the received signal strength from a mobile station at a single receiver drops below a predefined threshold.

Conventional methods, however, do not improve co-channel interference and receiver sensitivity on a time-slot by time-slot basis. Because TDMA systems sub-divide RF channels into time slots, the received signal quality may be degraded during a time slot of the uplink channel that is assigned to a particular mobile station. For example, the receiver sensity of a signal received from a mobile station at the fringes of a communication cell may be well below a desired level, requiring improvement during its allocated time-slot. Although conventional TDMA systems use receiver diversity continuously when receiving uplink RF signals, they do not provide for receiver diversity on a time-slot by time-slot basis. Therefore, there exists a need to improve received signal quality of an uplink RF channel that is subdivided into time slots during a selected time slot.

SUMMARY

The present invention that addresses this need is exemplified in a communication system that allocates receiver diversity and non-diversity time-slots based on received signal quality of an uplink RF channel. In this way, the system of the present invention improves the uplink coverage, including receiver sensitivity co-channel and adjacent-channel rejection, only when necessary and avoids waste of resources when receiver diversity is not needed.

In one aspect, the communication system of the invention includes a base station that is linked to a mobile station via one or more radio frequency channels that are subdivided into a plurality of time slots. The base station includes a plurality of receiver branches for receiving uplink data from the mobile station on diversity and non-diversity time-slots. The diversity time-slots are time slots during which the uplink data is received using more receiver branches than the non-diversity time-slots. The system of the invention also includes a controller that allocates the diversity and non-diversity time-slots based on a measure of received signal quality of the radio frequency channels that link the mobile station to the base station.

According to some of the more detailed features of the invention, the measure of received signal quality corresponds to one or a combination of measure of received signal strength, bit error rate, or frame erasure rate at the base station. In another feature of the present invention, the base station includes a baseband bus that allows selective combination of uplink data from the receiver branches. According to yet another feature of the invention, the uplink data is combined at the base station by an equalizer.

Other features and advantages of the present invention will become apparent from the following description of the preferred embodiment, taken in conjunction with the accompanying drawings, which illustrate, by way of example, the principles of the invention.

DETAILED DESCRIPTION

Figure 1:
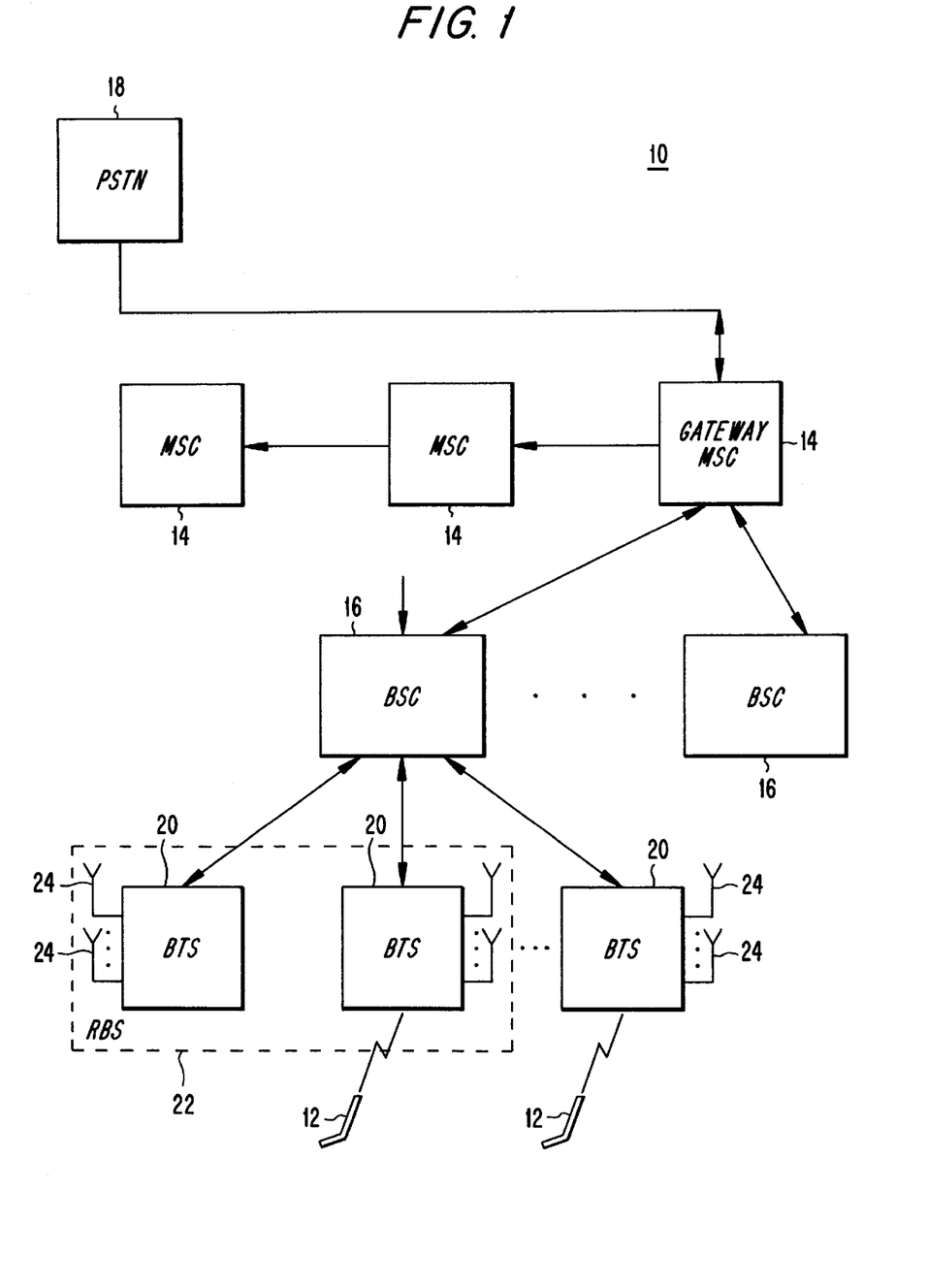
FIG. 1 is a block diagram of a communication system which advantageously uses the present invention.

Referring to FIG. 1, a communication system 10 according to an exemplary embodiment of the present invention operates according to the GSM standard. The mode of operation of GSM communication systems is described in European Telecommunication Standard Institute (ETSI) documents ETS 300 573, ETS 300 574 and ETS 300 578, which are hereby incorporated by reference. Therefore, the operation of the system 10 is described to the extent necessary for understanding of the present invention. Although, the present invention is described as embodied in a GSM system, those skilled in the art would appreciate that the present invention could be advantageously used in a wide variety of other digital communication systems, such as those based on PDC or D-AMPS standards.

The system 10 is designed as a hierarchal network with multiple levels for managing calls. Using an allocated set of uplink and downlink RF channels, which are subdivided into time slots, mobile stations 12 operating within the system 10 participate in calls using allocated time slots. At a high hierarchal level, a group of Mobile Service Switching Centers (MSCs) 14 are responsible for the routing of the calls from an originator to a destination. In particular, they are responsible for setup, control and termination of the calls. One of the MSCs 14, known as the gateway MSC, handles communication with a Public Switched Telephone Network (PSTN) 18, or other public and private networks.

At a lower hierarchal level, each one of the MSCs 14 are connected to a group of base station controllers (BSCs) 16. The primary function of a BSC 16 is mobility management. For example, based on reported received signal strength at the mobile stations 12, the BSC 16 determines whether to initiate a hand over, the process by which the calls are maintained without a noticeable break. The BSC 16 communicates with a MSC 14 under a standard interface known as the A-interface, which is based on the Mobile Application Part of CCITT Signaling System No. 7.

At a still lower hierarchal level each one of the BSCs 16 controls, a group of base transceiver stations (BTSs) 20. The BTSs 20 primarily provide the RF links for the transmission and reception of data bursts to and from the mobile stations 12. In a preferred embodiment of the invention, a number of BTSs 20 are incorporated into a radio base station (RBS) 22. In an exemplary embodiment, the PBS 22 may be configured according to a family of RBS-2000 products, which is offered by L M Ericsson, the assignee of the present invention.

Similar to other cellular communication systems, the system 10 subdivides a geographical area into contiguous communication cells that together provide communication coverage to a service area, for example, an entire city. The communication cells are patterned according to a cell pattern that allows some of the spaced apart cells to use the same uplink and downlink RF channels. In this way, the cell pattern of the system 10 reduces the number of frequency channels needed to cover the service area. The system 10 may also employs frequency hopping techniques, to avoid 'deadspots' and to minimize interference in the system.

Each BTS 20 includes a number of TRXs that use the uplink and downlink RF channels to serve a particular common geographical area, such as one or more communication cells. As described later in detail, the TRX includes a common pool of receiver branches for the reception of uplink signals. Under the preferred embodiment, the receiver branches receive uplink signals via a number of space diversity, or polarization diversity or a combination of space and polarization diversity antennas 24. This diversity arrangement improves the overall co-channel and adjacent-channel rejection and receiver sensitivity of an RF channel by continuously combining received signals at the diversity receivers of the TRXs.

In order to improve co-channel interference and receiver sensitivity on a time-slot by time-slot basis according to the present invention, the communication system 10 allocates some time slots for the reception of uplink information as diversity time-slots. Other time slots are designated as non-diversity time-slots. Accordingly, the diversity time-slots are time slots during which uplink data is received by more receiver branches than during non-diversity time-slots. As a result, by selective use of diversity reception, the present invention improves co-channel and adjacent-channel rejection and receiver sensitivity on a time-slot by time-slot basis, as needed.

The communication system 10 uses the BSC 16 for allocating the diversity and non-diversity time-slots. The BSC 16 instructs the RBS 22 to receive the information either via the diversity or non-diversity time-slots. The BSC 16 instructs the RBS 22 based on a measures of received signal quality of the RF channels that link the mobile stations 12 to the RBS 22. As described later in detail, the received signal quality may be measured based on a number of parameters, including received signal strength or bit error rate at the RBS 22.

By taking into account the received signal quality, the communication system 10 improves uplink coverage by efficiently allocating diversity and non-diversity communication resources. The BSC 16 dynamically increases the number of time slots allocated for diversity reception, if the received signal quality of the linking RF channels so require. For example, when a large number of mobile stations 12 are positioned at the fringes of a communication cell with degraded RF links on the non-diversity time slots, the BSC 16 can designate some of the non-diversity channels as diversity channels, to improve the uplink coverage. Similarly, the BSC 16 could reallocate the diversity time-slots as non-diversity time-slots, if the propagation properties of the RF channels are such that diversity reception is not necessary, thereby increasing system capacity.

As a result, the BSC 16 regularly adjusts the size of the pools of time slots used for diversity or non-diversity reception. In this way, by using more receiver resources, the system 10 improves the received signal quality during a selected time slot, thereby reducing capacity. Conversely, the capacity of the system 10 may be increases at the expense of reduced signal quality from the mobile stations. Therefore, the invention uses the common pool of receiver branches to balance the need for better reception of uplink signals with the need for capacity. As described later in detail, the BSC 16 also dynamically reallocates the diversity and non-diversity resources based on operating requirements of the system, for example, based on fault conditions reported by the RBS 22.

Figure 2:
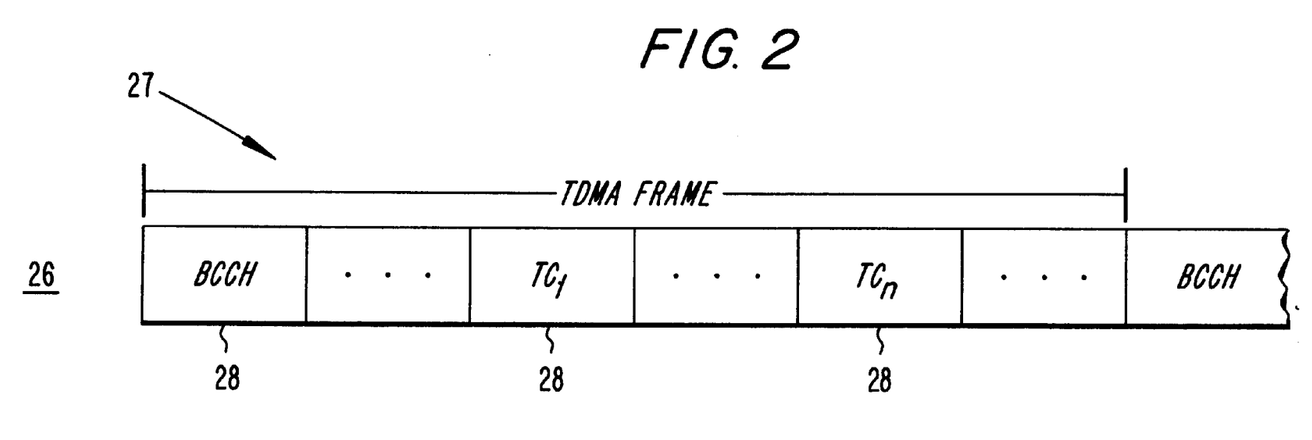
FIG. 2 is a diagram of a subdivided RF channel that is used in the communication system of FIG. 1.

With reference to FIG. 2, an RF channel 26 (uplink or downlink) is divided into repetitive time frames 27 during which information are transmitted. Each frame is further divided into time slots 28 that carry packets of information. The system 10 carries out the transmission of information during the time slots in bursts that contain a predefined number of encrypted bits. Speech data is transmitted during time slots designated as traffic channels ($TC_1, \ldots, TC_n$). All signaling functions pertaining to call management in the system, including initiations, hand overs, and termination are handled via control information transmitted over signaling channels.

The signaling channels may be transmitted during dedicated time slots or they may be transmitted in association with a number of traffic channels. For each cell, the BSC 16 allocates certain time slots on an RF channel as the dedicated signaling channels. For example, a dedicated control channel, known as Broadcast Control Channel (BCCH), is transmitted at the first time slot of the frame 27, to provide the mobile stations with general information about a BTS. The mobile stations 12 use the associated channels to transmit associated control signals, such as an RX-LEV signal, which corresponds to the received signal strength at the mobile station and RX-QUAL signal, which is a measure of various levels of bit error rate at the mobile station 12, as defined by the GSM standard.

Preferably, the BSC 16 designates all dedicated uplink signaling channels as diversity time-slots, to insure the reception of important signaling information from all the mobile stations 12 within a communication cell, including those far away from the RBS. On the other hand, associated signaling channels are allocated as diversity time-slots, if their corresponding traffic channels are allocated as diversity time-slots.

Figure 3:
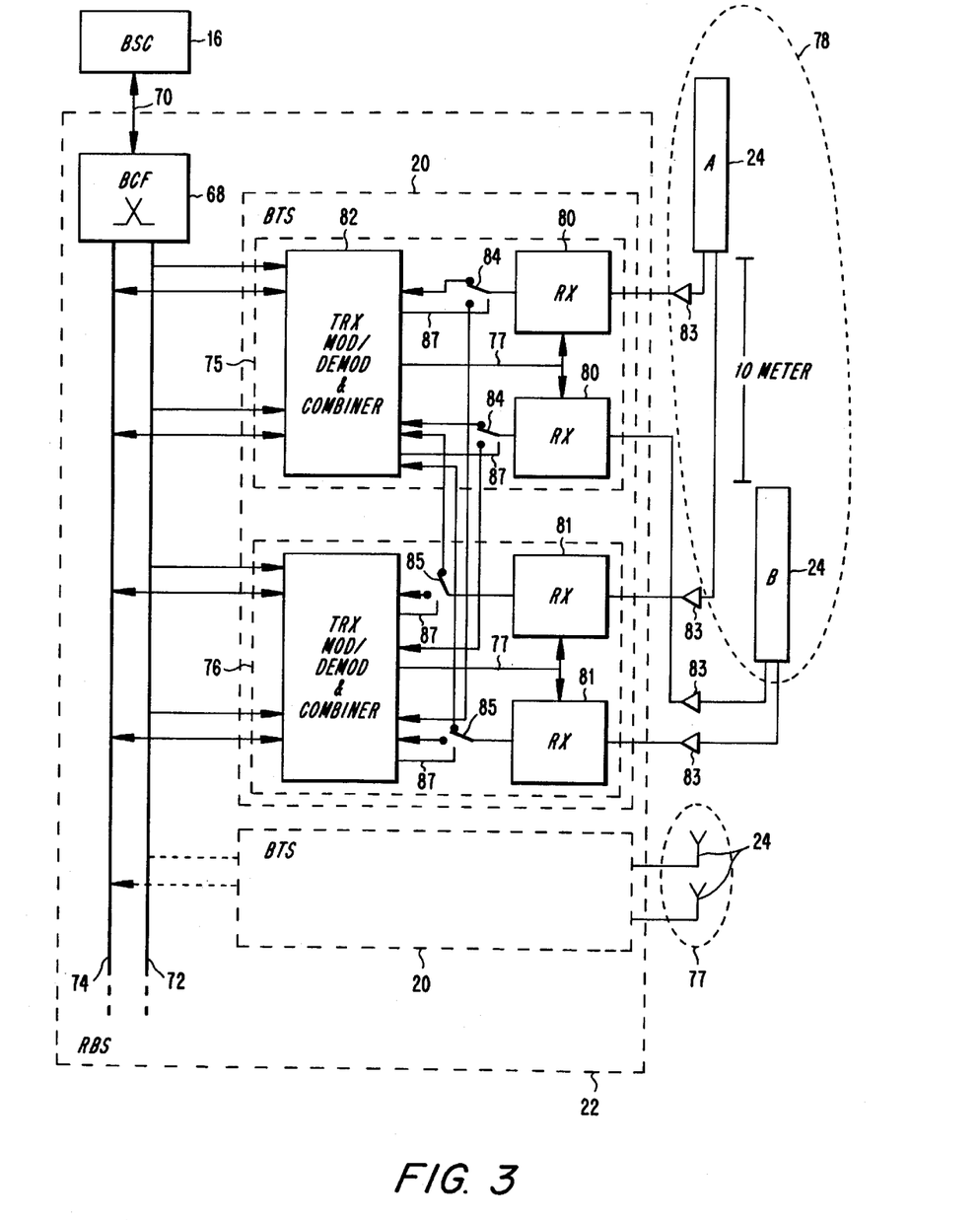
FIG. 3 is a block diagram of a radio base station according to one embodiment of the invention.

Referring to FIG. 3, the block diagram of the RBS 22 according to one embodiment of the invention is shown to include a plurality of BTSs 20 that serve different geographical areas. The RBS 22 includes a base station common function (BCF) block 68 that controls the operation and maintenance of the RBS 22. The BSC 16 interfaces with the BCF 68 through an A-bis interface on line 70. The BCF 68 controls the operation and maintenance (O & M) functions associated with the RBS 22. Through a timing bus 72, the BTSs 20 are synchronized with each other. Voice and data information are provided to and from the RBS 22 through a traffic bus 74 that may be coupled, through the A-bis interface, to a public or private voice and data transmission line, such as a T1 line (not shown).

Each BTS 20 includes two TRXs 75 and 76 that communicate with the mobile station 12 via antennas 24, which cover separate geographical areas 77 and 78. In an exemplary embodiment of the invention, the antennas 24 are dual polarized antennas that receive electromagnetic radio frequency waves on a horizontal and vertical field. Preferably, the antennas are spaced apart from each other, for example by 10 meters, to provide for un-correlated reception of uplink signals. As shown, two antennas designated as 24A and 24B are spaced accordingly to cover the coverage area 78. The TRXs 75 and 76 include pairs of receivers 80 and 81 that are coupled to the antennas 24A and 24B via RF amplifiers 83. The receiver pairs 80 and 81 apply the received uplink signals to corresponding TRX Modulator/Demodulator and combiner blocks 82 via switch pairs 84 and 85, which are incorporated into the TRXs 75 and 76, respectively.

The system 10 uses at least two receiver branches to provide diversity reception of all uplink signals received during diversity and non-diversity time slots. Each receiver branch is a reception path for the uplink signals through each one of the receivers 80 or 81 which are tuned by corresponding control signals on lines 77 from blocks 82. Under the control of switch control signals, on lines 87, the switch pairs 84 or 85 connect the uplink received signals from two or more receiver branches to the blocks 82 for diversity combination.

According to the present invention, the uplink received signal quality is improved by providing diversity reception on a slot by slot basis. Consequently, the switch pairs 84 and 85 are switched so that the TRX's 75 and 76 can dynamically receive the uplink signals either via a two-receiver-branch diversity or a four-receiver-branch-diversity arrangement, with each receiver branch being an independent path for receiving the uplink signals. In other words, during non-diversity time-slots less receiver branches are used than during diversity time-slots. Under this arrangement, the BSC 16 allocates certain time slots as diversity time slots during which four receiver branches are used for combining the received uplink signals. Other time slots are allocated as non-diversity time slots during which two receiver branches are used for combining the received signals. In this way, the BSC 16 makes an Intra-BTS hand over to move degraded communication from a non-diversity time slot to a diversity time-slot, to improve uplink signal quality. The antenna connection configurations for all antennas of the RBS 22 are stored in the BCF 68. Via the A-bis interface, the BSC 16 can access the antenna connection configuration information, when allocating diversity and non-diversity time slots.

In this embodiment of the invention, the block 82 includes a combiner for combining the uplink data from the receiver branches. The combiner may combine soft information (per bit or burst) provided at the output of a GSM equalizer (not shown). Alternatively, the combining of the uplink data may be performed by the equalizer within the block 82 using a suitable algorithm. The combining may also be done by selecting the receiver branch that provides the best quality and disregarding the rest. A combination of above described combining techniques may also be used.

Figure 4:
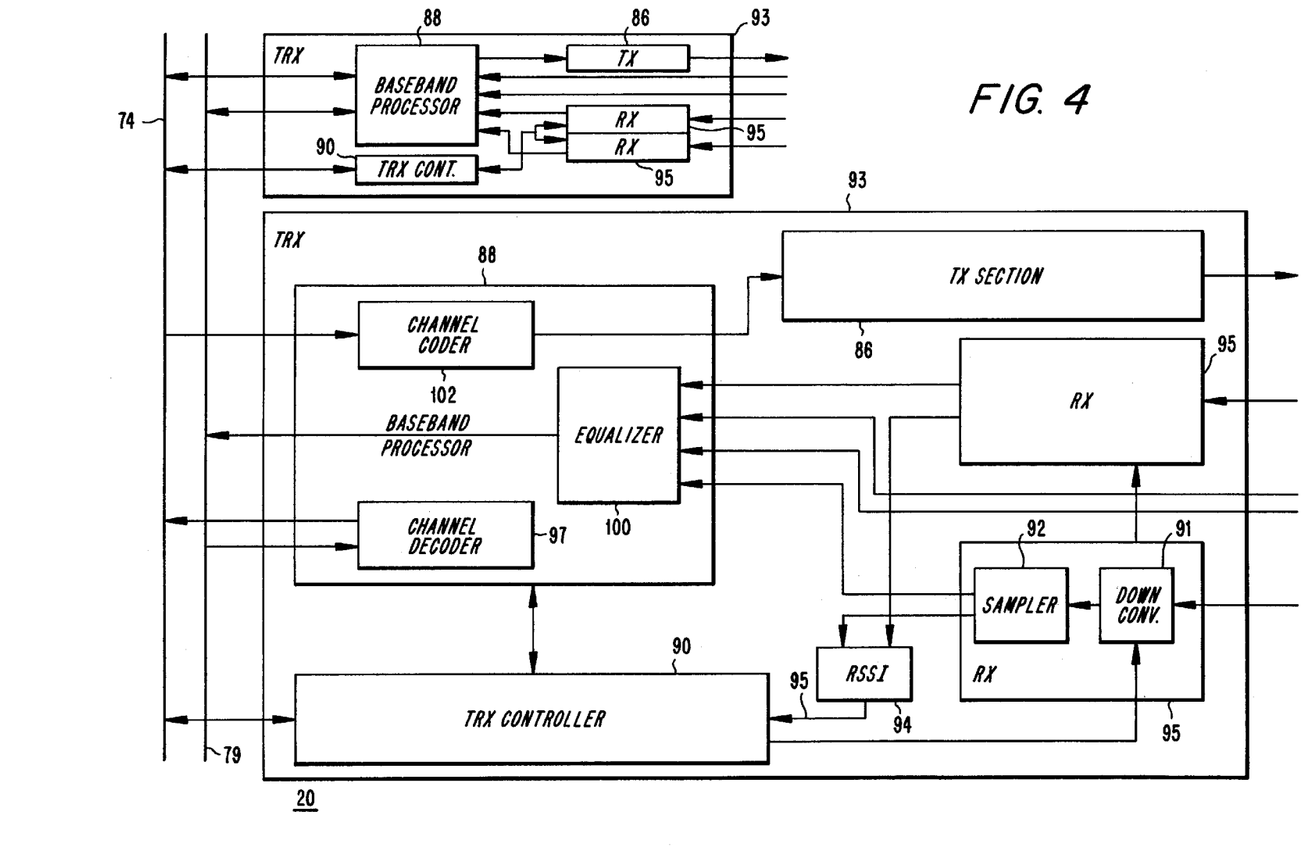
FIG. 4 is a block diagram of a radio base station according to another embodiment of the invention.

Referring to FIG. 4, a block diagram of a BTS 20 according to another embodiment of the invention is shown. The BTS 20 includes a pair of identical TRXs 93. Each TRX 93 includes a transmitter section 86, two receiver sections 95, a baseband processor 88 and a TRX controller 90. When transmitting downlink baseband data, the baseband processor 88 receives properly coded digitized speech from the BSC 16 over the traffic bus 74 and applies it to a channel coder 102 that codes and multiplexes the speech according to a GSM specified protocol. The transmitter section 86, which is coupled to the channel coder 102, transmits the down link baseband data via the antennas 24.

The receiver sections 95 down convert the uplink signals from the mobile station 12, via corresponding down conversion blocks 91 (only one block is shown). The down conversion blocks 91 are controlled by the TRX controller 90 for setting the receiver frequencies of the uplink RF channels. The TRX controller 90 sets the receiver frequencies based on instructions from the BSC 16 over the traffic bus 74. After down converting the received signals, the receiver sections 87 sample the signal (e.g., the phase and magnitude) via sampler blocks 92 (only one block is shown), to provide sampled signal data to the baseband processor 88.

In an exemplary embodiment, an RSSI estimator 94 provides an RSSI signal on line 95, which is a measure of propagation properties of the uplink RF channel. The RSSI estimator 94 measures noise disturbance levels during idle channels and received signal strength during active channels. The TRX controller 90, which is coupled to the traffic bus 74, processes the commands received from the BSC 16 and transmits TRX related information, such as various TRX measurements, to the BSC 16. Under this arrangement, the TRX 76 periodically reports the RSSI signal and noise disturbance levels to the BSC 16. The BSC 16 selects the diversity time-slots and non-diversity time-slots based on the quality of the RF channels. Using its receivers sections 95, the TRXs 93 detect channel activity by continuously measuring and averaging the noise disturbance levels on the RF channels. Based on such measurements, the TRX's 93 can inform the BSC 16 as to the quality of RF channels. By comparing a measurement from a particular channel to an average disturbance level measurement, the BSCs can assess the quality of a particular channel. The lower the disturbance level, the better the reception quality would be on that channel.

The present invention uses one or a combination of uplink signal quality parameters that are continuously measured for allocating diversity and non-diversity time-slots. These parameters include Bit Error Rate (PER), Frame Erasure Rate (FER), or received signal strength level (RX-LEV) parameters, which are measures of received signal quality of the uplink RF channel. In a well known way, the RX-LEV is measured by the RSSI block 94, and BER and FER are measured by a channel decoder in the BTSs 20. The BSC 16 receives the RSSI signal from the BTS 20 and compares them to a corresponding threshold. Preferably, the corresponding thresholds against which one or a combination of propagation path parameters BER, FER or, RX-LEV are compared are selected to indicate a condition warranting the use of either diversity or non-diversity time-slots. For example, an RX-LEV value below a low threshold would warrant the use of diversity reception and an RX-LEV value above an upper threshold would indicate suitability of non-diversity reception. Of course, the upper and lower threshold are selected to introduce hysteresis. Once a condition warranting the use of diversity is indicated, the BSC allocates a diversity time-slot for communicating with a mobile station. The BSC 16 then makes the intra-BTS hand over to switch from a non-diversity time-slot to a diversity time-slot. If suitability of non-diversity reception indicated, then the BSC 16 could switch from a diversity time-slot to a non-diversity time-slot.

During an initial selection phase, the BSC 16 determines the idle channel quality for each RF channel. Based on a predefined criteria associated with received signal quality on the RF channels, the BSC 16 allocates certain RF channels for diversity reception and others for non-diversity reception. For example, all time slots of RF channels having an idle channel quality that exceeds a predefined threshold may be allocated as non-diversity time-slots, because the uplink reception quality provided by such channels may not require the use of diversity reception. Conversely, all time slots of RF channels having a channel quality below the threshold may be allocated as diversity time-slots, to improve uplink coverage on such channels.

As described before, the present invention combines the received uplink signals from the receiver branches to improve uplink received signal quality on a time slot by time slot basis. Preferably, uplink baseband data received from different receiver branches are combined dynamically using a baseband bus 79 which interconnects the TRXs 93 to each other. Each RBS 22 within the system 10 also includes the baseband bus 79. The baseband bus 79, which is a TDMA bus, supports a protocol that allows the RBS 22 to selectively address the TRXs 93 for receiving and transmitting information during designated time slots. The baseband bus protocol uses separate packets of data to transfer baseband data, as well as address and control information among the TRXs 93. The packets, which are assembled by each TRX 93, carry baseband data and their TRX address over the baseband bus 79. This way, the uplink baseband data packets assembled by the baseband processors 88 can be associated with the address of the TRXs 93 selected by the BSC 16 for diversity reception.

The baseband processor 88 includes an equalizer 100 that receives the uplink sampled signal data from both receivers branches of a TRX 93. The equalizer 100 generates soft information per bit or burst (baseband data) for each receiver branch or combined soft information for the receiver branches by the equalizer 100. The equalizer 100 places the uplink baseband data over the baseband bus 79. The uplink baseband data on the baseband bus 79 is applied to a channel decoder 97 that combines baseband data from receiver branches and decodes the baseband signal according to the GSM specified protocol. The channel decoder 97 places the decoded baseband signal on the traffic bus 74, for further processing by the BSC 16. Over the traffic bus 74, the BSC 16 is kept informed of various operating conditions including antenna connection configuration within the RBS 22 and supplies address and timing information to the TRXs 93. The BSC provides address information to the TRX controller 90 on TRXs participating in the diversity reception. The TRX controller 90 then instructs the channel decoder 97 to combine the uplink baseband data from the addressed TRXs. In this way, the use of the baseband bus 79 significantly facilitates selective diversity reception of the invention on a time slot by time slot basis, as the BSC can specify the TRX addresses used for diversity reception.

Based on the information provided over the traffic bus, the BCF 68 determines the fault conditions associated with each one of the TRXs. The BCF 68 reports the fault conditions to the BSC 16 via the A-bis bus. According to yet another feature of the present invention, the BSC 16 reconfigures and reallocate the RBS resources used for diversity or non-diversity reception based on RBS fault reports. For example, if the RBS 22 reports a fault condition on one of its receiver sections, the BSC 16 would not allocate the faulty TRX 93 for diversity reception. If the fault is developed during the RBS operation, a TRX 93 allocated for diversity reception would be de-allocated, even eliminated, as a resource until the fault condition is cured. Once cured, the TRX 93 may be allocated for diversity reception by the BSC 16.

It is well known that the noise generated in each one of the receiver branches is independent of each other and, thus, un-correlated. Therefore, the sensitivity increases in accordance with that of an Additive White Gaussian Noise (AWGN) channel by:

10 log 10 (N) dB, where N is the number of receiver branches having un-correlated noise sources. Therefore, the co-channel and adjacent-channel rejection is improved by insuring the received signals by the receiver branches are substantially un-correlated. As described before, the antennas 24 are sufficiently spaced apart from each other to provide substantially un-correlated uplink received signals.

From the foregoing description, it will be appreciated that the communication system 10 according to the present invention substantially improves the uplink received signal quality, while providing an efficient allocation of diversity and non-diversity resources. It has been determined that the present invention improves the uplink coverage of the system by up to 5 dB. The present invention allocates the diversity and non-diversity resources based on individual RF links between the mobile stations 12 and the BTSs 20 as well as based on the operating conditions of the system 10. As described above, the improved coverage is traded for capacity in a dynamic manner. The allocation of resources according to the present invention increases communication throughput within the system 10, which would allow more calls to go through, especially in heavily congested communication cells.

Although the invention has been described in detail with reference only to a preferred embodiment, those skilled in the art will appreciate that various modifications can be made without departing from the invention. Accordingly, the invention is defined only by the following claims which are intended to embrace all equivalents thereof.

What is claimed is:

1. A digital communication system for providing communication coverage over radio frequency (RF) channels that are subdivided into a plurality of time slots during which information is communicated with at least one mobile station, comprising:

a base station including a plurality of receiver branches for receiving uplink data from the mobile station on selected ones of a number of diversity and non-diversity time-slots, wherein the diversity time-slots are time slots during which the uplink data is received by more receiver branches than the non-diversity time-slots; and a controller that allocates diversity and non-diversity time-slots based on a measure of received signal quality of at least one of the RF channels linking the mobile station to the base station.

2. The communication system of claim 1, wherein the measure of received signal quality corresponds to at least one of a measure of the received signal strength at the base station, or a measure of bit error rate at the base station, or a frame erasure rate at the base station.

3. The communication system of claim 1, wherein the base station measures the quality of idle RF channels, wherein the controller is responsive to the measure of idle channel quality for selecting the diversity and non-diversity time-slots.

4. The communication system of claim 1, wherein the base station includes an equalizer for combining the uplink data.

5. The communication system of claim 1, wherein the base station includes a baseband bus for selective addressing of the receiver branches used for reception during the non-diversity or diversity time-slots.

6. The communication system of claim 1, wherein the controller allocates the diversity and non-diversity time-slots based on fault reports received from the base station.

7. The communication system of claim 1, wherein the antennas are configured for space diversity.

8. The communication system of claim 1, wherein the antennas are dual polarized antennas.

9. The communication system of claim 1, wherein the controller performs an intra-base-station hand over for switching reception between a non-diversity time slot and a diversity time slot.

10. A base station for transmitting and receiving information over RF channels that are subdivided into a plurality of time slots during which the information is communicated with at least one mobile station, comprising:

a plurality of receiver branches for receiving uplink information from the mobile station on any one of a number of non-diversity and diversity time-slots, wherein the diversity time-slots are time slots during which the uplink data is received by more receiver branches than during the non-diversity time-slots; and a controller that allocates diversity and non-diversity time-slots based on a measure of received signal quality of at least one of the RF channels linking the mobile station to the base station.

11. The base station of claim 10, wherein the measure of received signal quality corresponds to at least one of a measure of the received signal strength at the base station, or a measure of bit error rate at the base station, or a frame erasure rate at the base station.

12. The base station of claim 10, wherein the base station measures the quality of idle RF channels, wherein the controller is responsive to the measure of idle channel quality for selecting the diversity and non-diversity time-slots.

13. The base station of claim 10, wherein the base station includes an equalizer for combining the uplink data.

14. The base station of claim 10, wherein the base station includes a baseband bus for selective addressing of the receiver branches used during the non-diversity or diversity time-slots.

15. The base station of claim 10, wherein the controller allocates the diversity and non-diversity time-slots based on fault reports received from the base station.

16. The base station of claim 10, wherein the antennas are configured for space diversity.

17. The base station of claim 10, wherein the antennas are dual polarized antennas.

18. The base station of claim 10, wherein the controller performs an intra-base-station hand over for switching reception between a non-diversity time slot and a diversity time slot.

19. A method for receiving uplink data from at least one mobile station over at least one radio frequency (RF) channel that is subdivided into a plurality of time slots, comprising:

receiving the uplink data from the mobile station during a selected one of a number of diversity and non-diversity time-slots, wherein the non-diversity time-slots are time slots during which the uplink data is received using less receiver branches than during the diversity time-slots; and allocating the diversity and non-diversity time-slots based on a measure of received signal quality of at least one of the RF channels linking the mobile station to the base station.

20. The method for receiving uplink data according with claim 19 further including combining the uplink data received during at least the diversity time slots.

21. The method for receiving uplink data according with claim 20, wherein combining is performed on data received from selected receiver branches over a baseband bus.

22. The method for receiving uplink data according with claim 21, wherein the combining of the uplink data is performed by an equalizer.

23. The method for receiving uplink data according with claim 19, wherein the measure of received signal quality corresponds to a measure of the received signal strength at the base station, or a measure of bit error rate at the base station, or a frame erasure rate at the base station.

24. An apparatus for receiving uplink data from at least one mobile station over at least one radio frequency (RF) channel that is subdivided into a plurality of time slots, comprising:

receiver branches that receive the uplink data from the mobile station during a selected one of a number of diversity and non-diversity time-slots, wherein the non-diversity time-slots are time slots during which the uplink data is received using less receiver branches that than during the diversity time-slots; and means for allocating the diversity and non-diversity time-slots based on a measure of received signal quality of at least one of the RF channels linking the mobile station to the base station.

25. The apparatus for receiving uplink data according with claim 24 further including a combiner that combines the uplink data received during at least the diversity time slots.

26. The apparatus for receiving uplink data according with claim 25, wherein the combiner includes means for receiving data from selected receiver branches over a baseband bus.

27. The apparatus for receiving uplink data according with claim 25, wherein the combiner includes an equalizer that combines the uplink data.

28. The apparatus for receiving uplink data according with claim 24, wherein the measure of received signal quality corresponds to a measure of the received signal strength at the base station, or a measure of bit error rate at the base station, or a frame erasure rate at the base station.

29. The communication system of claim 1, wherein the controller dynamically reallocates the diversity and non-diversity time-slots based on operating requirements of the system.

30. The base station of claim 10, wherein the controller dynamically reallocates the diversity and non-diversity time-slots based on operating requirements of the system.

31. The method of claim 19, wherein the diversity and non-diversity time-slots are dynamically reallocated based on operating requirements of the system.

32. The apparatus of claim 24, wherein the controller dynamically reallocates the diversity and non-diversity time-slots based on operating requirements of the system.

* * * * *